(12) United States Patent
Archibald

(10) Patent No.: US 7,054,325 B1
(45) Date of Patent: May 30, 2006

(54) CORRELATION OF SIGNALLING MESSAGES

(75) Inventor: David Moir Archibald, Dalkeith (GB)

(73) Assignee: Agilent Technologies, Inc., Palo Alto, CA (US)

( * ) Notice: Subject to any disclaimer, the term of this patent is extended or adjusted under 35 U.S.C. 154(b) by 818 days.

(21) Appl. No.: 09/679,078

(22) Filed: Oct. 5, 2000

(30) Foreign Application Priority Data

Oct. 8, 1999 (GB) ................................. 9923866.9

(51) Int. Cl.
H04L 12/28 (2006.01)
(52) U.S. Cl. .................... 370/410; 370/496; 370/522
(58) Field of Classification Search ................ 370/252, 370/469, 496, 522, 524, 395.3, 410, 467
See application file for complete search history.

(56) References Cited

U.S. PATENT DOCUMENTS

| 5,377,186 | A | * | 12/1994 | Wegner et al. ............... 370/220 |
| 5,712,908 | A | * | 1/1998 | Brinkman et al. ...... 379/114.28 |
| 5,867,558 | A | | 2/1999 | Swanson |
| 6,169,735 | B1 | * | 1/2001 | Allen et al. .................. 370/352 |
| 6,226,289 | B1 | * | 5/2001 | Williams et al. ............ 370/385 |
| 6,324,179 | B1 | * | 11/2001 | Doshi et al. ........... 370/395.61 |
| 6,389,130 | B1 | * | 5/2002 | Shenoda et al. ........ 379/221.08 |
| 6,434,140 | B1 | * | 8/2002 | Barany et al. ............... 370/352 |
| 6,456,845 | B1 | * | 9/2002 | Drum et al. ................. 455/424 |
| 6,493,444 | B1 | * | 12/2002 | Williams ............... 379/221.08 |
| 6,563,816 | B1 | * | 5/2003 | Nodoushani et al. ....... 370/352 |

FOREIGN PATENT DOCUMENTS

| EP | 0742662 A1 | 11/1996 |
| EP | 0805609 A2 | 11/1997 |
| EP | 0948163 A1 | 10/1999 |

OTHER PUBLICATIONS

Patent Application Publication, Carson et al., Oct. 17, 2002, Generating Call Detail Records*
Patent Application Publication, Marsico, Dec. 25, 2003, Methods and Systems for Improving Trunk Utilization for Calls to Ported Numbers.*

* cited by examiner

Primary Examiner—Chau Nguyen
Assistant Examiner—Joshua Kading

(57) ABSTRACT

Signalling messages conforming to different signalling protocols in a distributed switch telecommunications network are correlated by associating specific pairs of messages according to parameters they have in common. Inter-MGC IAMs and SS7 IAMs are correlated by the combination of Calling & Called address parameters; the connection descriptor parameter included in inter-MGC IAMs and MGCP OK messages can be used to correlate these messages; and the MGCP OK message can be correlated with the MGCP CRCX message using the transaction ID. Hence a correspondence can be deduced between an MGCP endpointname (in the CRCX message) and an ISUP OPC-DPC-CIC identification (in the SS7 IAM).

17 Claims, 3 Drawing Sheets

Parameters used to correlate between messages

1  IAM      >   [Calling, called], [OPC,DPC,CIC]

2  CRCX     >   [endpointname], [Transaction id]

3  OK       >   [Transaction Id], [Connection Descriptor]

4  IAM      >   [Calling,Called] , [Connection Descriptor]

Example Network Architecture

Parameters used to correlate between messages

1 IAM  > [Calling, called], [OPC,DPC,CIC]

2 CRCX > [endpointname], [Transaction id]

3 OK   > [Transaction Id], [Connection Descriptor]

4 IAM  > [Calling,Called] , [Connection Descriptor]

Fig.3

CORRELATION OF SIGNALLING MESSAGES

TECHNICAL FIELD

This invention relates to correlation of signalling messages conforming to different protocols, for example for bearer identifier discovery in a distributed switch environment.

BACKGROUND ART

Existing telecommunications networks, for example the international public switched telephone network (PSTN) are typically configured so that equipment (such as switches) in the transmission or bearer network, which carries user traffic (voice and data signals), is co-located with equipment (such as signalling points) in the associated signalling network, which carries control signals for coordinating the operation of the bearer network.

However, attention is now being directed to the possibility of telecommunications networks comprising distributed telecommunications switches, in which there is a separation of the switching/adaptation functionality from the signalling functionality. Furthermore, consideration is being given to the possibility of connecting dissimilar such networks (i.e. networks relying on different bearer technologies and/or signalling protocols).

Dissimilar telecommunications networks are typically interconnected via a "gateway" which provides the necessary conversions or adaptations between the bearer traffic and signalling protocol in each of the networks. In such an architecture control devices such as Media Gateway Controllers can be physically remote from the adaptation devices, such as Media Gateways. Media Gateway Controllers can communicate with the Media Gateways they control using protocols such as Simple Gateway Control Protocol (SGCP), Media Gateway Control Protocol (MGCP), and the Megacop/H.248 protocol currently being defined. Media Gateway Controllers communicate with each other using extensions of current Call Control protocols such as Signalling System No.7 ISDN User Part (SS7 ISUP), Session Initiation Protocol (SIP—IETF RFC 2543), or ITU Recommendation H.323. New protocols may be defined for this interface in the future.

Protocol monitoring applications, such as tracing across a signalling network the protocol messages associated with a call, or building Call Data Records (CDRs) to summarise the key parameters relating to a call, require the ability to correlate across different protocols, which may refer to a single entity in multiple different, inconsistent ways. It is an object of this invention to facilitate such correlation.

DISCLOSURE OF INVENTION

According to one aspect of this invention there is provided a method of establishing a correlation between the contents of signalling messages conforming to different protocols but relating to a common bearer data item, comprising the steps of:

monitoring messages traversing at least first and second signalling channels which conform to respective first and second signalling protocols;

selecting first messages containing an identification related to an end user of said bearer data item and a first identification of a bearer channel carrying said bearer data item;

selecting second messages containing a second identification of a bearer channel carrying said bearer data item and a call identifier with system-wide significance;

selecting third messages containing an identification related to an end user of said data item and a call identifier with system-wide significance; and using said selected third messages to establish a correlation between the first and second bearer channel identifications.

According to another aspect of this invention there is provided a method of establishing a correlation between the contents of signalling messages conforming to different protocols but relating to a common bearer data item, comprising the steps of:

monitoring messages traversing at least first and second signalling channels which conform to respective first and second signalling protocols;

selecting first messages containing an identification related to an end user of said bearer data item and a first identification of a bearer channel carrying said bearer data item;

selecting second messages containing a second identification of a bearer channel carrying said bearer data item and a transaction identifier;

selecting third messages containing an identification related to an end user of said data item and packet network address information;

selecting fourth messages containing packet network address information and a transaction identifier; and using said selected third and fourth messages to establish a correlation between the first and second bearer channel identifications.

According to a further aspect of this invention there is provided a method of establishing a correlation between the contents of signalling messages conforming to different protocols but relating to a common bearer data item, comprising the steps of:

monitoring messages traversing at least first and second signalling channels which conform to respective first and second signalling protocols;

selecting first call initiation messages containing a first identification of a bearer channel carrying said bearer data item;

selecting second call initiation messages containing a second identification of a bearer channel carrying said bearer data item;

determining elapsed time between occurrence of said first and second messages; and establishing a correlation between first and second messages for which the elapsed time is below a predetermined threshold, and thus between the first and second bearer channel identifications.

According to another aspect of this invention there is provided apparatus for establishing a correlation between the contents of signalling messages conforming to different protocols but relating to a common bearer data item, comprising:

monitoring equipment for monitoring messages traversing at least first and second signalling channels which conform to respective first and second signalling protocols;

a first selector for selecting first messages containing an identification related to an end user of said bearer data item and a first identification of a bearer channel carrying said bearer data item;

a second selector for selecting second messages containing a second identification of a bearer channel carrying said bearer data item and a call identifier with system-wide significance;

a third selector for selecting third messages containing an identification related to an end user of said data item and a call identifier with system-wide significance; and a correlator for establishing a correlation between the first and second bearer channel identifications in accordance with said selected third messages.

According to a further aspect of this invention there is provided apparatus for establishing a correlation between the contents of signalling messages conforming to different protocols but relating to a common bearer data item, comprising:

monitoring equipment for monitoring messages traversing at least first and second signalling channels which conform to respective first and second signalling protocols;

a first selector for selecting first messages containing an identification related to an end user of said bearer data item and a first identification of a bearer channel carrying said bearer data item;

a second selector for selecting second messages containing a second identification of a bearer channel carrying said bearer data item and a transaction identifier;

a third selector for selecting third messages containing an identification related to an end user of said data item and packet network address information;

a fourth selector for selecting fourth messages containing packet network address information and a transaction identifier; and a correlator for establishing a correlation between the first and second bearer channel identifications in accordance with said selected third and fourth messages.

According to another aspect of this invention there is provided apparatus for establishing a correlation between the contents of signalling messages conforming to different protocols but relating to a common bearer data item, comprising:

a monitor for monitoring messages traversing at least first and second signalling channels which conform to respective first and second signalling protocols;

a first selector for selecting first call initiation messages containing a first identification of a bearer channel carrying said bearer data item;

a second selector for selecting second call initiation messages containing a second identification of a bearer channel carrying said bearer data item;

a monitor for determining elapsed time between occurrence of said first and second messages; and a correlator for establishing a correlation between first and second messages for which the elapsed time is below a predetermined threshold, and thus between the first and second bearer channel identifications.

BRIEF DESCRIPTION OF DRAWINGS

A method and apparatus in accordance with this invention, for correlation of signalling messages to enable bearer identifier discovery in a distributed switch environment, will now be described, by way of example, with reference to the accompanying drawings, in which:

FIG. 3 lists protocol fields which may be used to correlate messages relating to a single call traversing multiple telecommunications media.

BEST MODE FOR CARRYING OUT THE INVENTION, & INDUSTRIAL APPLICABILITY

Figure 1:
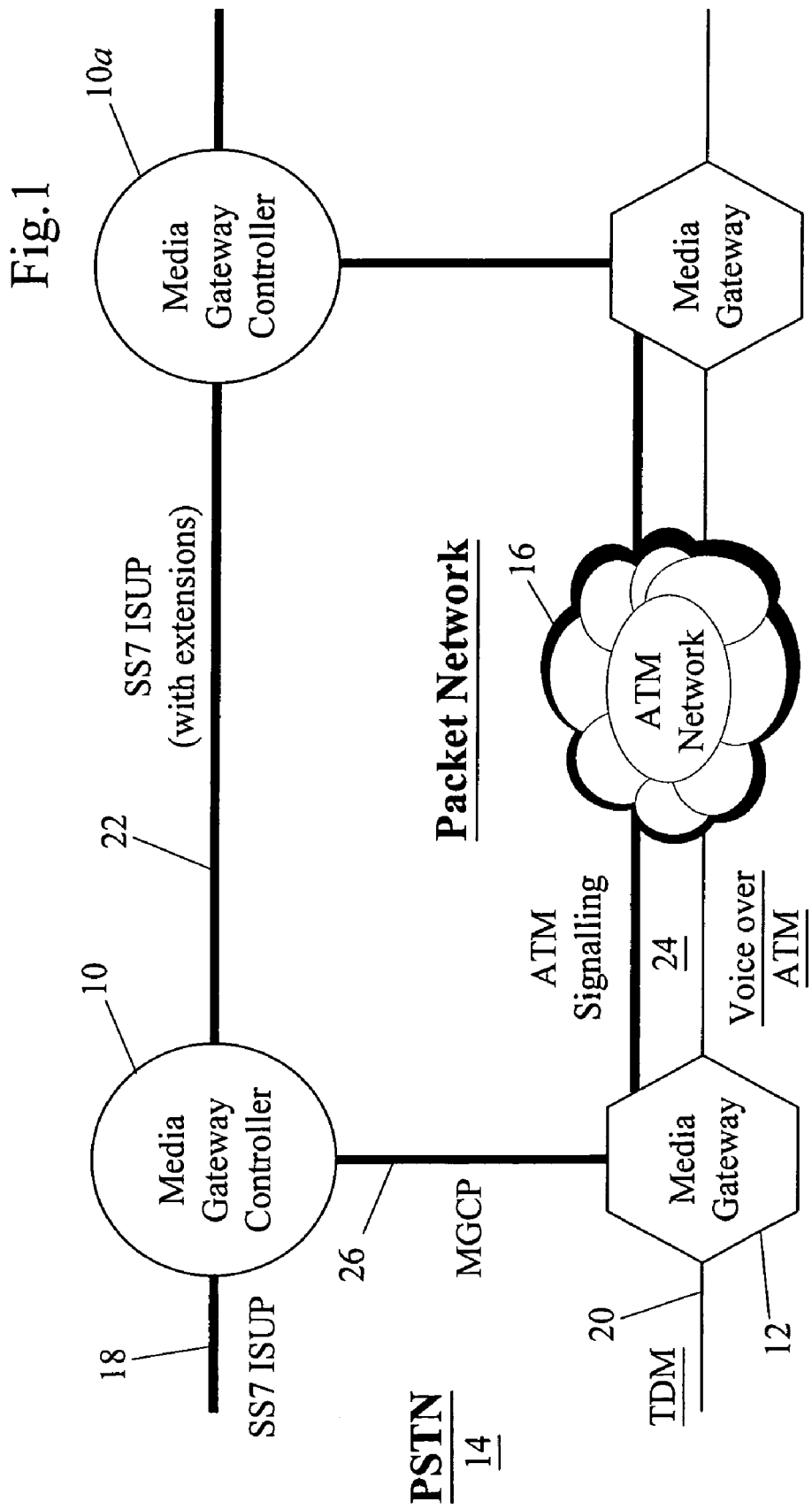
FIG. 1 shows the topology of an exemplary network incorporating multiple telecommunications media and distributed switches.

Referring to FIG. 1, a Media Gateway Controller (MGC) 10 and an associated Media Gateway (MG) 12 link the public switched telephone network (PSTN) 14 to a packet network 16, which in this example is shown as using Asynchronous Transfer Mode (ATM) technology. The PSTN 14 uses SS7 ISUP over its signalling links 18 to the MGC, and time division multiplexing (TDM) for transmission of user traffic (for example voice calls and other bearer data items) over its transmission or bearer channels 20 to the MG 12. The MGC 10 exchanges signalling messages with other MGCs, such as an MGC 10a, over a signalling link 22 using SS7 ISUP with extensions which have been previously defined for this purpose. The MG 12 transfers the voice calls, in the form of Voice over ATM messages, to and from the ATM network 16 over ATM channels 24 which also carry ATM signalling messages in conventional manner. The MGC 10 controls the MG 12 via a link 26 carrying MGCP messages.

Figure 2:
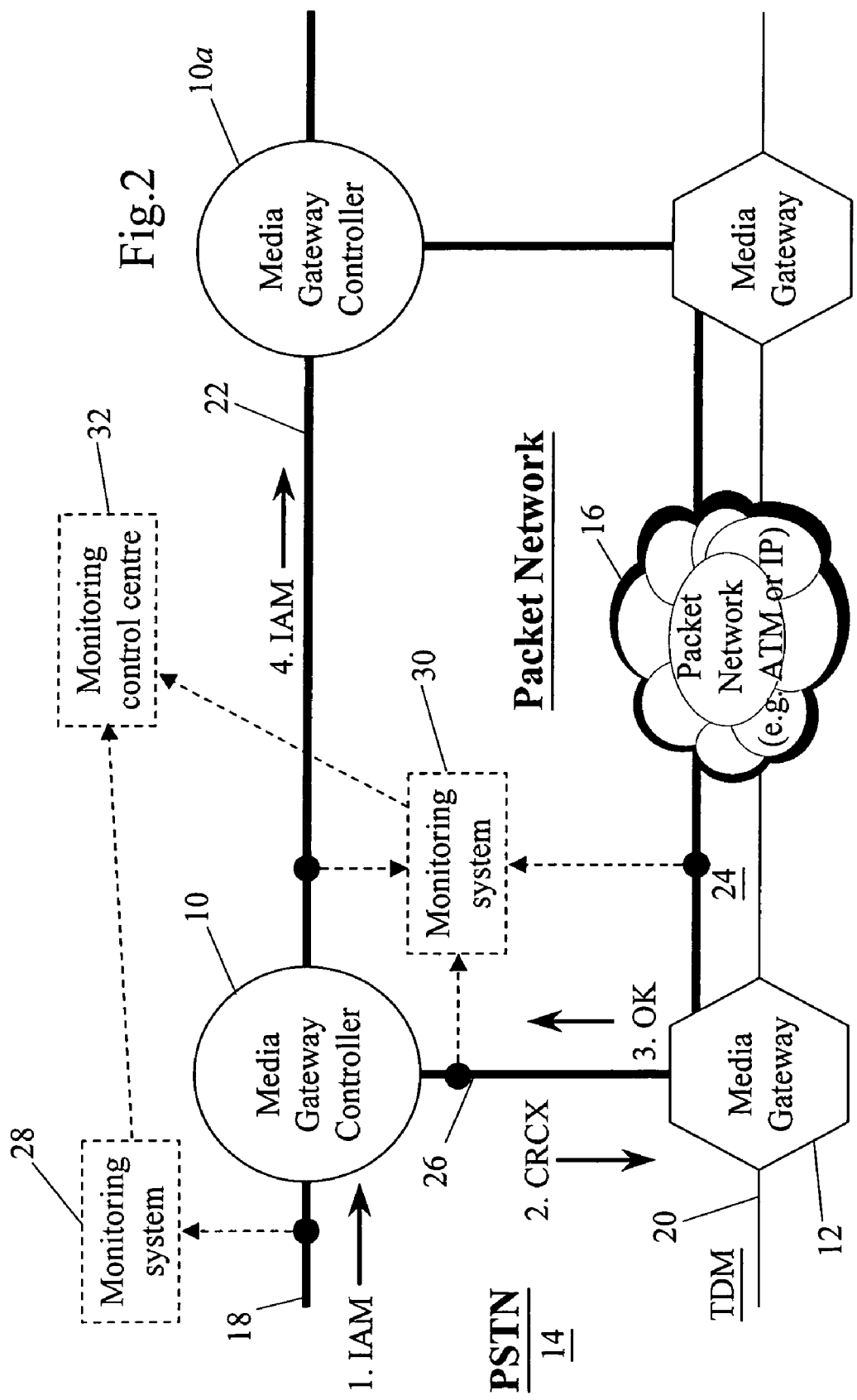
FIG. 2 shows a possible sequence of signalling messages used to set up a call across a network such as that of FIG. 1.

FIG. 2 shows part of one possible sequence of messages used to set up a call across such a network, as follows:
1. the PSTN 14 sends an Initial Address Message (IAM) to the MGC 10;
2. the MGC 10 then sends a Create Connection (CRCX) message to the MG 12, to define an endpoint for a packet network connection over the channels 24;
3. when this has been accomplished the MG 12 returns an OK acknowledgement containing address information for the packet network endpoint, coded as a Session Description Protocol (SDP-RFC 2327) Connection Description Parameter;
4. thereafter the MGC sends another IAM over the link 22 to the packet network.

In calls controlled by a single MGC message number 4 does not occur. For a call in the opposite direction, i.e. terminating in the PSTN, the same messages would occur but the messages 1 and 4 would be interchanged.

Although the different messages on their respective links all relate to the same overall call or transaction, the different ways in which their respective protocols identify the call (e.g. by reference to the subscriber, or to the equipment used to carry the call, or to an arbitrary reference number) prevent a simple association of these messages to derive a complete description of the call. Such descriptions are desirable, for example, to build Call Detail Records for billing and other management functions, or in order to trace progress of the call through the system during fault finding.

FIG. 3 highlights fields in (by way of example) the SS7 and MGCP protocols which may be used to correlate messages belonging to a single call traversing the network shown in FIG. 2. The PSTN trunk associated with a call is identified in the SS7 ISUP (or Telephone User Part—TUP) signalling by the combination of Destination Point Code (DPC), Originating Point Code (OPC) and Circuit Identification Code (CIC) fields, as defined in the ITU's Recommendation Q.767. In the MGCP protocol used between the MGC and the MG, the same trunk is identified by an endpointname of the form localEndpointname@Domainname, where localEndpointname is a character string, and Domainname is a Domain name as defined by the Internet Engineering Task Force's document RFC 821. In order to associate, say, an SS7 ISUP call protocol sequence with the corresponding MGCP protocol sequence, it is necessary to be able to correlate these two identifications.

The invention enables the association between the SS7 OPC-DPC-CIC trunk identification and the endpointname used by the MGCP (or any similar protocol) to be discovered and stored for subsequent use by any appropriate application program, such as for billing.

To this end, the various signalling links and channels in the network surrounding the MGC 10 are provided with passive monitoring devices 28 and 30 as shown in FIG. 2. For monitoring SS7 links Hewlett-Packard acceSS7 monitoring equipment may be used; for other channels (e.g. ATM or IP) equipment of similar functionality with interfaces adapted to match those technologies would be used. The monitoring devices 28 and 30 detect and generate copies of all signalling messages traversing the links and channels around the MGC 10. These copies are then transferred, for example via a local area network, to a monitoring control centre 32, which typically comprises data storage equipment and associated data processing equipment operating under the control of appropriate software program instructions to perform the required analyses of the data collected.

Using the data thus acquired, a table of associations between OPC-DPC-CIC identifications and endpointnames can be built by the monitoring control centre 32. For this purpose the required associations are deduced as follows:

where an IAM between MGC's (inter-MGC IAM) is generated following the arrival of an SS7 IAM (or vice versa), these two messages can be correlated by the combination of Calling & Called address parameters;

the SDP connection description parameter included in inter-MGC IAMs and MGCP OK messages can be used to correlate these messages;

the MGCP OK message can be correlated with the MGCP CRCX message using the transaction ID included in both of them.

Thus each pair of message types described above provides a step in a sequence by which all four types of messages can be associated as relating to a single call: SS7 IAM with inter-IAM; inter-IAM with MGCP OK; and MGCP OK with MGCP CRCX. This in turn enables the required correspondence to be deduced between an MGCP endpointname (in the CRCX message) and an ISUP OPC-DPC-CIC identification (in the SS7 IAM).

This requires the buffering of initial IAM and MGCP messages for a short time, for example in the monitoring control centre, until the associated messages on the other links occur and can be detected.

Another way of making an association (although it is only tentative in nature) is to correlate the OPC-DPC-CIC identification from the SS7 IAM with the endpointname in an MGCP CRCX message which occurs within a predetermined short time interval after the IAM arrives (and provided no other such IAM messages occur between the times the chosen IAM and the CRCX are monitored, and also provided no subsequent CRCX messages are monitored during a suitably long time period thereafter). Associations detected in this manner should be marked as 'suspected' rather than 'known' in the table, until they can be confirmed by the first technique described above. This approach may speed up the discovery process in cases where a high proportion of calls are controlled by a single MGC.

This alternative method can be refined by eliminating from consideration any messages containing OPC-DPC-CIC identifications or endpointnames already present (as 'known') in the association table. This increases the probability that the messages under consideration will reduce to a single IAM and CRCX pair. As the table of discovered associations becomes more nearly complete, this method becomes more successful.

The association table can be accessed in use by protocol monitoring applications which need to establish linkages between messages relating to a particular call. Depending on the particular type of application, 'suspected' associations could be either ignored or used, with an appropriate warning to the application user.

The techniques described above eliminate the need for error-prone manual configuration of an association table, as has been previously required. They rely only on standardised protocol message formats, and thus avoid the possible need to deal with multiple, proprietary, vendor-specific Operation Support System (OSS) interfaces as would be required if data to build the association table were extracted from such OSSs.

The invention has been described by way of example in the context of SS7 and MGCP protocols. However, it will be understood that the invention is equally applicable in connection with the use of any other protocol defining messages which contain indications of end users and/or bearer channels.

What is claimed is:

1. A method of establishing a correlation between the contents of signalling messages conforming to different protocols but relating to a common bearer data item, comprising the steps of:

monitoring messages traversing at least first and second signalling channels which conform to respective first and second signalling protocols;

selecting first messages including an identification related to an end user of said bearer data item and a first identification of a bearer channel carrying said bearer data item;

selecting second messages including a second identification of a bearer channel carrying said bearer data item and a call identifier;

selecting third messages including, an identification related to an end user of said data item and a call identifier; and using said selected third messages to establish a correlation between the first and second bearer channel identifications.

2. The method of claim 1, wherein the first messages include SS7 ISUP Initial Address Messages, the end user identification comprises calling and called party addresses, and the first bearer channel identification comprises an OPC-DPC-CIC combination.

3. The method of claim 1, wherein the second messages include MGCP Create Connection messages and the second bearer channel identification comprises endpoint identifier parameters.

4. The method of claim 1, wherein the third messages include ISUP Initial Address Messages and the end user identification comprises calling and called party addresses.

5. A method of establishing a correlation between the contents of signalling messages conforming to different protocols but relating to a common bearer data item, comprising the steps of:

monitoring messages traversing at least first and second signalling channels which conform to respective first and second signalling protocols;

selecting first messages including an identification related to an end user of said bearer data item and a first identification of a bearer channel carrying said bearer data item;

selecting second messages including a second identification of a bearer channel carrying said bearer data item and a transaction identifier;

selecting third messages including an identification related to an end user of said data item and packet network address information;

selecting fourth messages including packet network address information and a transaction identifier; and using said selected third and fourth messages to establish a correlation between the first and second bearer channel identifications.

6. The method of claim 5, wherein the fourth messages comprise responses to said second messages.

7. The method of claim 5, wherein the fourth messages include MGCP Response messages, the packet network address information comprises an SDP connection descriptor parameter, and the transaction identifiers comprise transaction ID parameters.

8. The method of claim 5, wherein the first messages include SS7 ISUP Initial Address Messages, the end user identification comprises calling and called party addresses, and the first bearer channel identification comprises an OPC-DOC-CIC combination.

9. The method of claim 5, wherein the second messages include MGCP Create Connection Messages and the second bearer channel identification comprises endpoint identifier parameters.

10. The method of claim 5, wherein the third messages include ISUP Initial Address Messages and the end user identification comprises calling and called party addresses.

11. A method of establishing a correlation between the contents of signalling messages conforming to different protocols but relating to a common bearer data item, comprising the steps of:

monitoring messages traversing at least first and second signalling channels which conform to respective first and second signalling protocols;

selecting from among the monitored messages first call initiation messages including a first identification of a bearer channel carrying said bearer data item;

selecting from the monitored messages second call initiation messages including a second identification of a bearer channel carrying said bearer data item;

determining elapsed time between occurrence of said first and second messages; and establishing a correlation between first and second messages for which the elapsed time is below a predetermined threshold, and thus between the first and second bearer channel identifications.

12. The method of claim 11, wherein establishment of a correlation between first and second messages is also dependent upon absence of any messages similar to the first messages and of any message similar to the second messages within a predetermined time interval.

13. The method of claim 11, wherein the first messages include SS7 ISUP Initial Address Messages, the end user identification comprises calling and called party addresses, and the first bearer channel identification comprises an OPC-DPC-CIC combination.

14. The method of claim 11, wherein the second messages are MGCP Create Connection messages and the second bearer channel identification comprises endpoint identifier parameters.

15. Apparatus for establishing a correlation between the contents of signalling messages conforming to different protocols but relating to a common bearer data item, comprising:

monitoring equipment configured to monitor messages traversing at least first and second signalling channels which conform to respective first and second signalling protocols;

a first selector configured to select first messages including an identification related to an end user of said bearer data item and a first identification of a bearer channel carrying said bearer data item;

a second selector configured to select second messages including a second identification of a bearer channel carrying said bearer data item and a call identifier;

a third selector configured to select third messages including an identification related to an end user of said data item and a call identifier; and a correlator configured to establish a correlation between the first and second bearer channel identifications in accordance with said selected third messages.

16. Apparatus for establishing a correlation between the contents of signalling messages conforming to different protocols but relating to a common bearer data item, comprising:

monitoring equipment configured to monitor messages traversing at least first and second signalling channels which conform to respective first and second signalling protocols;

a first selector configured to select first messages including an identification related to an end user of said bearer data item and a first identification of a bearer channel carrying said bearer data item;

a second selector configured to select second messages including a second identification of a bearer channel carrying said bearer data item and a transaction identifier;

a third selector configured to select third messages including an identification related to an end user of said data item and packet network address information;

a fourth selector configured to select fourth messages including packet network address information and a transaction identifier; and a correlator configured to establish a correlation between the first and second bearer channel identifications in accordance with said selected third and fourth messages.

17. Apparatus for establishing a correlation between the contents of signalling messages conforming to different protocols but relating to a common bearer data item, comprising:

a monitor configured to monitor messages traversing at least first and second signalling channels which conform to respective first and second signalling protocols;

a first selector configured to select from the monitored messages first call initiation messages including a first identification of a bearer channel carrying said bearer data item;

a second selector configured to select from the monitored messages second call initiation messages including a second identification of a bearer channel carrying said bearer data item;

a monitor configured to determine elapsed time between occurrence of said first and second messages; and a correlator configured to establish a correlation between first and second messages for which the elapsed time is below a predetermined threshold, and thus between the first and second bearer channel identifications.

* * * * *